United States Patent [19]

Sayanagi

[11] Patent Number: 4,643,563
[45] Date of Patent: Feb. 17, 1987

[54] COLOR IMAGE DATA PROCESSING METHOD

[75] Inventor: Kazuo Sayanagi, Yokohama, Japan

[73] Assignee: Canon Kabushiki Kaisha, Tokyo, Japan

[21] Appl. No.: 634,056

[22] Filed: Jul. 25, 1984

[30] Foreign Application Priority Data

Jul. 29, 1983 [JP] Japan .................................. 58-139994

[51] Int. Cl.$^4$ ............................................. G01N 21/25
[52] U.S. Cl. ...................................... 355/77; 356/405; 356/406
[58] Field of Search ............................ 355/32, 35, 77; 356/405, 406, 407, 410, 402, 425; 364/525, 526

[56] References Cited

U.S. PATENT DOCUMENTS 3,804,531  4/1974  Kosaka et al. ...................... 356/405

Primary Examiner—L. T. Hix
Assistant Examiner—D. Rutledge
Attorney, Agent, or Firm—Fitzpatrick, Cella, Harper & Scinto

[57] ABSTRACT

There is provided a color image data processing method for reproducing a color image by use of micro color points of a plurality of colors. The processings for every region to obtain the areas of the color points are performed in parallel irrespective of which region in a plurality of regions on the chromaticity chart the color which should be reproduced belongs to, and among the respective processing results, the color points whose areas were determined to be positive values are used, thereby reproducing a color image.

6 Claims, 2 Drawing Figures

COLOR IMAGE DATA PROCESSING METHOD

BACKGROUND OF THE INVENTION

1. Field of the Invention

The present invention relates to a color image data processing method for reproducing a color image by use of micro color points of a plurality of colors.

2. Description of the Prior Art

In conventional printing, micro color points of each color of, e.g., cyan C, magenta M, yellow Y, and black K are used and by making the areas of color points different, various colors are reproduced.

The area of the color point of each color has been conventionally determined by performing processings such as masking processing, undercolor removal and inking in consideration of unnecessary absorption of respective colors of Y, M, C, and K which are actually used for the density at which the printing should be done on the basis of photograph technology. However, it is conventionally well known that this method is imperfect since the densities which are used have various problems. It is an old method in printing that the chrominance calculations are carried out with respect to eight colors of Y, M, C, K, red R, green G, blue B, and white W. An example of these chrominance calculations is disclosed in H. E. Neugebauer, "Z. Photo. 34 (4)", pages 73–89, 1937; A. C. Hardy et al, "J. Opt. S Am 38", pages 300–307, 1948, and the like.

However, in these examples, it is difficult to obtain the area of the color point as an unconditional solution due to the calculations since a number of (eight) colors are handled. Therefore, the following method has been proposed. Namely, in case of printing, since the rentinal points of different colors overlap, the color points of eight colors finely appear and it is therefore impossible to obtain the unconditional solution to derive three retinal point areas which can realize the color which should be reproduced. On the other hand, if the number of colors which are used for reproduction is limited to (R, G, B), (Y, M, C), K, and W, the calculations can be easily solved. A parenthesis ( ) denotes that one of the colors which are included therein is selected. However, different coefficients have to be used for six kinds of different combinations of primary colors used, namely, for six regions for color reproduction.

These six regions are represented by chromaticity coordinates of color reproduced; they are as shown in FIG. 1. In the chart, coordinates x and y are so-called variables indicating the chromaticity, and total seven points consisting of standard chromaticity Y, M and C of DIN, and R, G, B, and white point which are caused by them are represented as PY, PM, PC, PR, PG, PB, and PW, respectively.

The calculating expression to obtain the color point area in each region is the similar linear expression with three unknowns as that of the masking processing in the photograph and is of the same type of equation as a form. A different point is that the color densities of three layers are used as the variables in the photograph, while color stimulus specifications of three colors (simply, chrominance signals of three colors at the light intensity) are used in this case. Also in this case, different calculations have to be performed in six regions.

On the other hand, in case of executing a plurality of different calculation processings in accordance with the color which should be reproduced, two methods are considered:

(i) the chromaticity is examined and it is discriminated to see which region the chromaticity belongs to, then the correct processing is selected and the calculation is performed;

(ii) look-up tables for the inputs and outputs are prepared in the whole chromaticity range and they are referred to. However, the method (i) needs the additional calculation for discrimination, so that this delays processing. The method (ii) requires a large storage device and in the case where the chromaticity of color point or three stimulus specifications which are used for color reproduction, namely, when the condition for color reproduction is changed, the content of the storage device has to be all replaced.

SUMMARY OF THE INVENTION

The present invention is made in consideration of the above-mentioned problems and intends to provide a color reproducing method which can remarkably shorten the calculation processing time without requiring a large-scale storage device.

Also, another object of the invention is to provide a color reproducing method which can cope with the change of condition for color reproduction by merely changing only a few constants.

The above and other objects and features of the present invention will be apparent from the following detailed description in conjunction with the accompanying drawings.

DETAILED DESCRIPTION OF THE PREFERRED EMBODIMENTS

One embodiment of the present invention will now be described hereinbelow. First, the calculating expression in each region will be obtained. Three stimulus specifications of each primary color are represented as shown in the following table.

| Primary colors | Three stimulus specifications | Relation in magnitude |
| --- | --- | --- |
| W | $X_w, Y_w, Z_w$ | Can be all normalized to 1. |
| Y | $X_y, Y_y, Z_y$ | $X_y, Y_y > Z_y$ |
| M | $X_m, Y_m, Z_m$ | $X_m, Z_m > Y_m$ |
| C | $X_c, Y_c, Z_c$ | $Y_c, Z_c > X_c$ |
| R | $X_r, Y_r, Z_r$ | $X_r > Y_r, Z_r$ |
| G | $X_g, Y_g, Z_g$ | $Y_g > X_g, Z_g$ |
| B | $X_b, Y_b, Z_b$ | $Z_b > X_b, Y_b$ |
| K | $X_k, Y_k, Z_k$ | All are about 0. |

Figure 1:
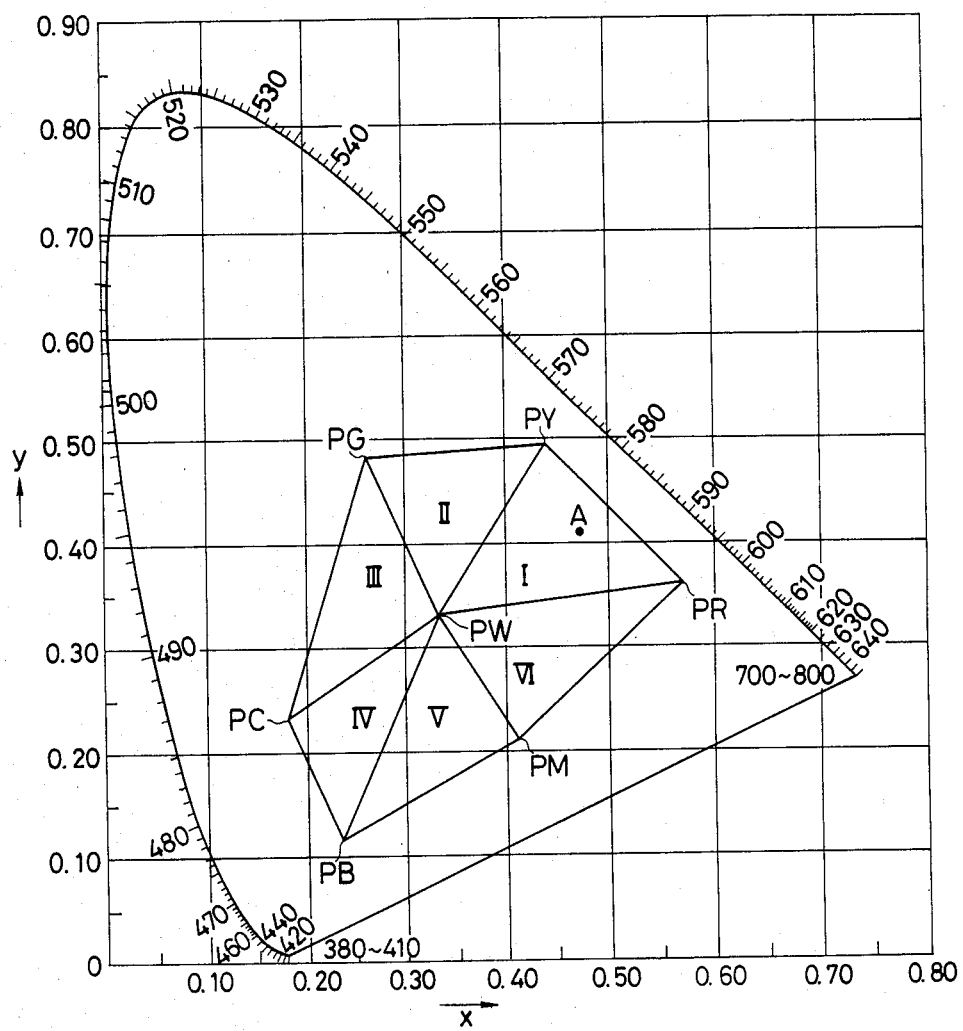
FIG. 1 is a diagram showing six regions in the IOC color coordinates.

It is assumed that the three stimulus specifications of the reproduction color (for instance, point A in the chromaticity chart in FIG. 1) which should be reproduced by a color printer are X, Y and Z; that the respective point areas of the respective colors R, G, B, Y, M, C, K, and W are $a_r, a_g, a_b, a_y, a_m, a_c, a_k,$ and $a_w$; and that the reproduction color lies in a region I of FIG. 1. At this time, it is possible to represent as follows.

$$\left.\begin{array}{l}1 = a_w + a_y + a_r + a_k \\ X = a_w X_w + a_y X_y + a_r X_r + a_k X_k \\ Y = a_w Y_w + a_y Y_y + a_r Y_r + a_k Y_k \\ Z = a_w Z_w + a_y Z_y + a_r Z_r + a_k Z_k\end{array}\right] \quad \text{(Expression 1)}$$

Solutions of $a_w$, $a_y$, $a_r$, and $a_k$ can be obtained from this expression (1).

On the other hand, by substituting the first simple expression in expression (1) for the second to fourth expressions therein, following expression (2) will be derived.

$$\left.\begin{array}{l}1-X=a_y(1-X_y)+a_r(1-X_r)+a_k(1-X_k) \\ 1-Y=a_y(1-Y_y)+a_r(1-Y_r)+a_k(1-Y_k) \\ 1-Z=a_y(1-Z_y)+a_r(1-Z_r)+a_k(1-Z_k)\end{array}\right] \quad \text{(Expression 2)}$$

The above expression (2) can be also conversely easily solved similarly to expression (1).

Since these expressions (1) and (2) are so-called linear equations with four unknowns or linear equations with three unknowns, they can be solved by use of a matrix.

For example, now assuming that the respective three color stimulus specifications in the example of FIG. 1 are $$\left.\begin{array}{lll}X_w = & Y_w = & Z_w = 1.00 \\ X_y = 0.800 & Y_y = 0.900 & Z_y = 0.118 \\ X_m = 0.750 & Y_m = 0.384 & Z_m = 0.695 \\ X_c = 0.229 & Y_c = 0.292 & Z_c = 0.750 \\ X_r = 0.650 & Y_r = 0.411 & Z_r = 0.080 \\ X_g = 0.210 & Y_g = 0.380 & Z_g = 0.202 \\ X_b = 0.210 & Y_b = 0.105 & Z_b = 0.560 \\ X_k = 0.050 & Y_k = 0.050 & Z_k = 0.080\end{array}\right] \quad \text{(Relation 2)}$$

expression (3) will be obtained as the solutions of expression (2) in the region I, $$\left.\begin{array}{l}a_y = \phantom{0.001 +} -1.505X + 2.591Y - 1.086Z \\ a_r = 0.001 + 3.554X - 3.100Y - 0.455Z \\ a_k = 1.052 - 2.045X + 0.597Y + 0.396Z\end{array}\right] \quad \text{(Expression 3)}$$

and expression (4) will be further derived in a region II, $$\left.\begin{array}{l}a_y = -0.001 - 5.246X + 5.854Y - 0.607Z \\ a_r = \phantom{-0.001} + 6.792X - 5.923Y - 0.869Z \\ a_k = \phantom{-0.001\ +\ } 1.052 - 2.522X + 1.012Y + 0.458Z\end{array}\right] \quad \text{(Expression 4)}$$

Expressions can be also similarly obtained with respect to the other four regions.

In these expressions, $a_y$, $a_r$ and $a_k$ indicate the areas in which the primary colors Y, R and K appear, respectively.

On the other hand, in case of realizing $a_p$, $a_r$ and $a_k$ due to the print by means of the overlapping of the areas of color points (retinal points) of Y, M and C which has been conventionally considered, they are obtained by coaxially overlapping the respective points of Y, M and C. For example, in the case where the color points are sequentially overlapped on a recording paper in accordance with the order of Y, M and C, the areas $a_Y$, $a_M$ and $a_C$ which are actually formed with respect to Y, M and C satisfy the relation of $a_Y > a_M > a_C$ and can be represented by expression (5).

$$\left.\begin{array}{ll}a_Y - a_M = a_y & \ldots \text{Remainder of } Y \\ a_M - a_C = a_r & \ldots \text{Overlapped portion of} \\ & \phantom{\ldots} Y \text{ and } M \\ a_C \phantom{- a_M} = a_k & \ldots \text{Overlapped portion of} \\ & \phantom{\ldots} \text{the three}\end{array}\right] \quad \text{(Expression 5)}$$

In the digital print whereby the color points are coaxially dotted, by conversely solving the above expression (5), the expression can be represented by expression (6).

$$\left.\begin{array}{l}a_Y = a_y + a_r + a_k \\ a_M = a_r + a_k \\ a_C = a_k\end{array}\right] \quad \text{(Expression 6)}$$

Expression (3) and the like can be converted to $a_Y$, $a_M$ and $a_C$ by use of the relation of expression (6). For instance, in correspondence to expression (3), we will have $$\left.\begin{array}{l}a_Y = 1.053 + 0.004X + 0.088Y - 1.145Z \\ a_M = 1.053 + 1.509X - 2.503Y - 0.059Z \\ a_C = 1.052 - 2.045X + 0.597Y + 0.396Z\end{array}\right] \quad \text{(Expression 7)}$$

Similarly, the areas $a_Y$ in the other regions are expressed as follows.

$$a_Y = 1.051 - 0.976X + 0.943Y - 1.018Z \qquad \text{II}$$

$$a_Y = 1.053 - 0.297X + 0.912Y - 1.668Z \qquad \text{III}$$

$$a_Y = 1.053 - 1.204X + 1.944Y - 1.793Z \qquad \text{IV}$$

$$a_Y = 1.052 - 0.015X + 1.030Y - 2.067Z \qquad \text{V}$$

$$a_Y = 1.052 - 0.493X + 0.945Y - 1.504Z \qquad \text{VI}$$

The respective coefficients of the respective expressions with regard to these six regions extremely differ. The areas $a_M$ and $a_C$ can be also expressed for every region and their coefficients also differ.

Figure 2:
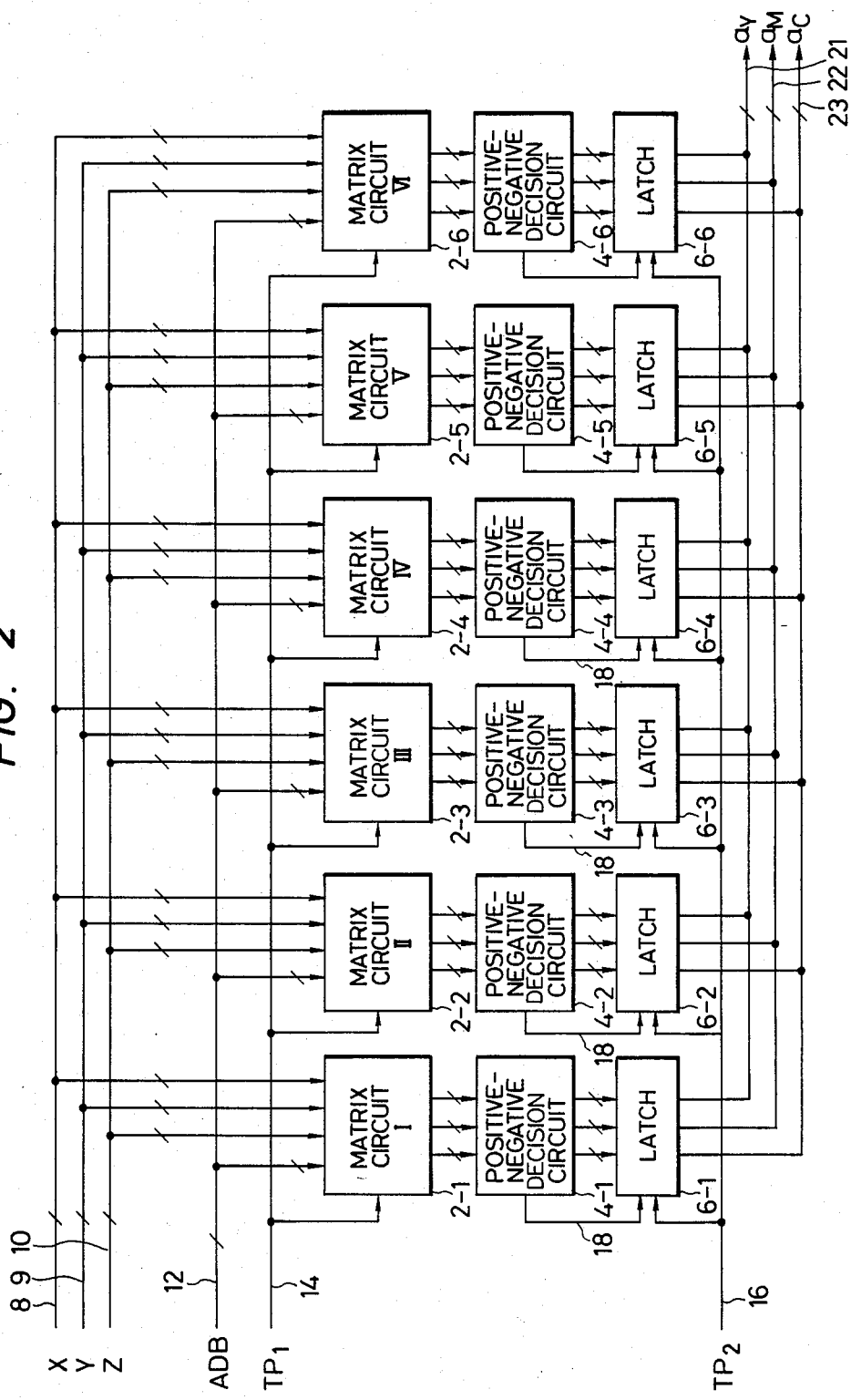
FIG. 2 is a diagram showing a circuit to perform the color reproduction processing.

FIG. 2 is a diagram showing a circuit to perform the processings as mentioned above. In the diagram, numerals 2-1 to 2-6 denote matrix circuits and the circuit 2-1, for example, performs the matrix arithmetic operation shown in expression (7). Numerals 4-1 to 4-6 indicate positive-negative decision circuits to discriminate between positive and negative in the outputs of the matrix circuits 2-1 to 2-6, respectively; 6-1 to 6-6 are latch circuits; 8, 9 and 10 are input signal lines for the color stimulus values X, Y and Z of the color which should be reproduced; 12 shows an address line and data line from a host computer (not shown); 14 and 16 are timing signal lines from the host computer; and 18 shows positive-negative discriminating signal lines which are output from the positive-negative decision circuit 4-1 to 4-6.

The color stimulus specifications X, Y and Z of the color which should be reproduced are input as the digital signals in parallel to the matrix circuits 2-1 to 2-6 in response to a timing pulse TP1. The matrix circuit 2-1 carries out the matrix arithmetic operation shown in expression (7), while the other matrix circuits 2-2 to 2-6 execute the matrix arithmetic operations in accordance with the respective regions II to VI. Now assuming that the location on the chromaticity chart of the color to be reproduced is point A in FIG. 1, the output data $a_Y$, $a_M$ and $a_C$ of the matrix circuit 2-1 are all positive values. However, either one or two of the respective output data $a_Y$, $a_M$ and $a_C$ of the other matrix circuits 2-2 to 2-5 become certainly negative values. Thus, only the positive-negative discriminating signal line 18 of the positive-negative decision circuit 4-1 becomes a high level and the other signal lines 18 become a low level. Therefore, the output data $a_Y$, $a_M$ and $a_C$ of only the latch circuit 6-1 are latched and the data are read out in response to a timing pulse TP2. No data is latched in the other latch circuits 6-2 to 6-6.

As described above, since only the matrix circuit of which all output data have positive values among the matrix circuits 2-1 to 2-6 is selected, the correct solution in accordance with the region on the chromaticity chart is obtained without performing the processing for discrimination of region before the matrix arithmetic operation. In addition, the matrix circuits 2-1 to 2-6 can be changed through the address and data line 12 from the host computer.

Although the case where the region was divided into six subregions has been described above, in the case where the color points of R, G and B each having particularly high purity are used for color reproduction, it is enough that only Y among Y, M and C may be added or Y and M may be added. In such a case, the region is divided into four or five subregions and also the number of matrix circuits may be four or five. In addition, the invention can be also accomplished by disenabling a portion of matrix circuits by the host computer.

As described above, according to the present invention, there is no need to examine to which region the color which should be reproduced belongs before calculation processing, thereby enabling the processing time to be remarkably reduced. In addition, a storage device with large capacity is unnecessary. Further, it is possible to quickly cope with changes in the color reproduction condition.

What is claimed is:

1. A color image data processing method comprising the steps of:
    receiving, as input data, a plurality of color component values representing a color picture element to be reproduced;
    performing in parallel a plurality of operations for a respective plurality of predetermined regions in a color coordinate system on the chromaticity chart of the color of the picture element, wherein areas for a predetermined number of colors to reproduce the picture element are determined by applying the operations to the plurality of color component values; and
    selecting a result of an operation that provides positive values for the areas for using those areas to reproduce the picture element.

2. A method according to claim 1, wherein the color component values are three stimulus specifications and the areas used to reproduce the picture element are obtained from three stimulus specifications of the color to be reproduced.

3. A method according to claim 2, wherein the picture element is reproduced by using cyan, magenta and yellow.

4. A method according to claim 1, further comprising the steps of:
    discriminating positive and negative values of the areas obtained in said performing step; and
    selecting the values determined to be positive in said discriminating step.

5. A method according to claim 1, wherein a color reproduction range to be reproduced is divided into six regions on the chromaticity chart.

6. A method according to claim 5, wherein said six regions are divided by the respective cyan, magenta, yellow, red, blue, green, and white points on the chromaticity chart.

* * * * *